May 29, 1945.　　　E. C. LUNDEBERG　　　2,377,020
GAUGE
Filed June 19, 1943
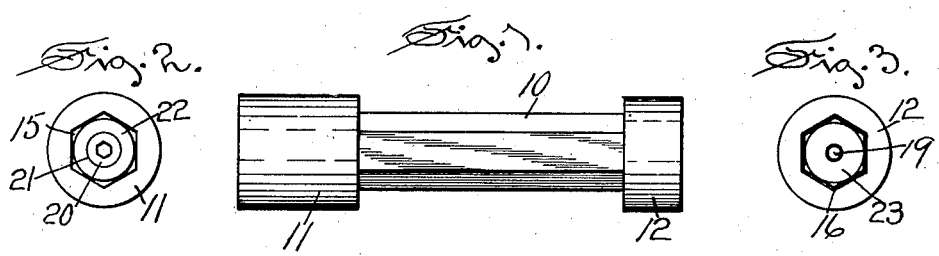
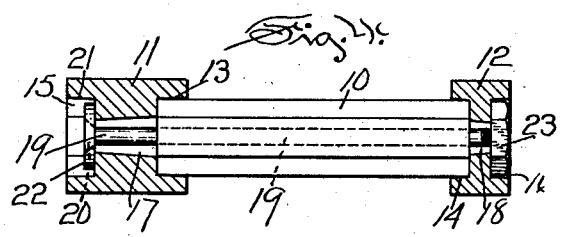
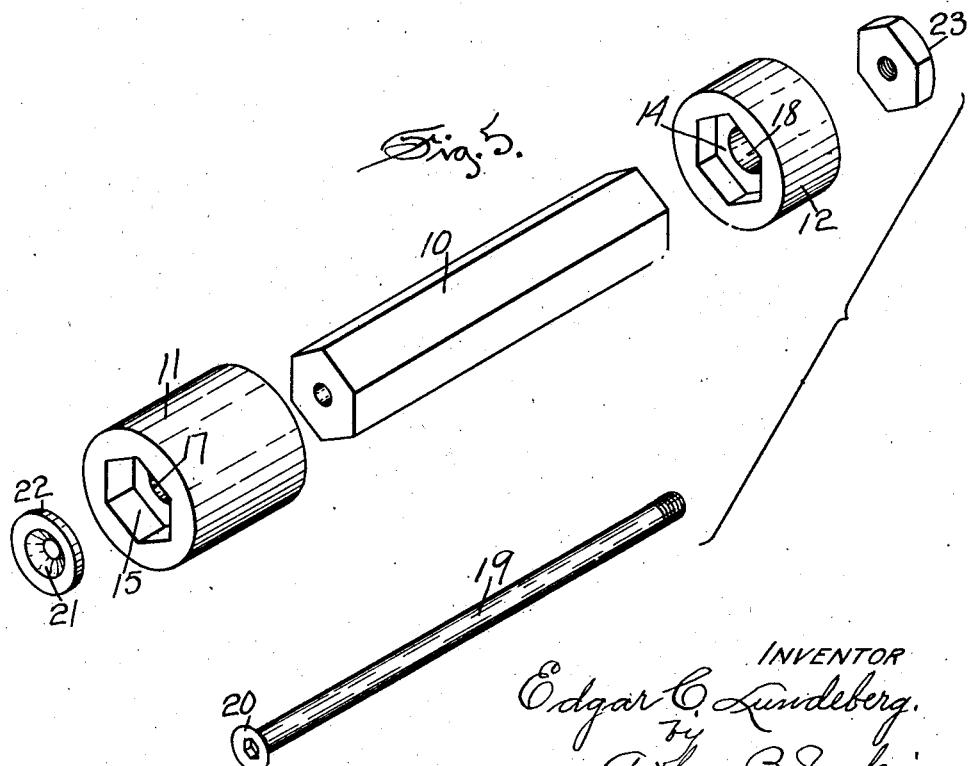
INVENTOR
Edgar C. Lundeberg.
By
Arthur B. Jenkins,
ATTORNEY Patented May 29, 1945

2,377,020

UNITED STATES PATENT OFFICE 2,377,020

GAUGE

Edgar C. Lundeberg, Hartford, Conn.

Application June 19, 1943, Serial No. 491,477

8 Claim. (Cl. 33—178)

My invention relates more particularly to that class of gauges in which associated gauges are secured to opposite ends of a stock or handle, some of such gauges being commonly known as "go" and "no-go" gauges, and an object of the invention, among others, is the production of a gauge of this type that shall be simple in construction and particularly efficient in operation.

One form of a gauge embodying the invention and in the construction and use of which the objects herein set out, as well as others, may be attained is illustrated in the accompanying drawing, in which—

Figure 1 is a side view of a gauge embodying my invention.

Figure 2 is a view of one end of the same.

Figure 3 is a view of the opposite end.

Figure 4 is a view in central lengthwise section, the stock being shown in full.

Figure 5 is an isometric view of the several parts of the device separated but in relative juxtapositions suitable for assembly.

In the accompanying drawing the numeral 10 denotes the stock of my improved gauge that is of non-circular shape in cross section, as herein shown this being hexagonal as a preferred form. This stock is of suitable size to serve as a handle for manipulation of the gauges secured to opposite ends of the stock. While my invention is not necessarily limited to such, said gauges are in the form known in shop parlance as "go" and "no-go" gauges, which are secured to opposite ends of the stock, as shown in Fig. 4. These gauges are preferably round in cross section and each has a recess 13 or 14 shaped to conform to the shape of the stock, the opposite ends of which stock fit within said recesses and are secured therein as shown in Fig. 4. Recesses 15—16 are formed in the outer ends of the gauges, these recesses being preferably of hexagonal form and holes 17—18 extend from the inner to the outer recess in each gauge. These holes are preferably tapered from a smaller diameter at the outer end to a larger diameter at the inner recess, as shown in Fig. 4.

A rod 19 having a head 20 extends from the recess 15 into the recess 13, the head of such rod being preferably of the shape of the head of a screw and fitting within a countersunk recess 21 in a disk 22 that in fact comprises the main head of the rod, the opposite end of the rod being screw threaded to receive a nut 23 that is employed to draw the two gauge members together to firmly seat the opposite ends of said stock in the recesses 13—14, and thereby rigidly secure the two gauge members 11—12 in place and firmly connect them in a manner that will be readily understood.

I claim:

1. A gauge device including a stock of non-circular shape in cross section, gauge members having associated functions for cooperative relation requiring to be relationally positioned for such functions secured to the ends of said stock by means of a recess in each gauge member shaped to closely fit the end of said stock, each of said members having a recess in its outer end, a bolt having a head secured against inward movement in one of said recesses and extending through said gauge members and through said stock, and a nut secured to the threaded end of said bolt in the other of said recesses to draw the gauge members into tight engagement with the bottoms of said recesses.

2. A gauge device including a stock of hexagonal shape in cross section, gauge members having associated functions for cooperative relation requiring to be relationally positioned for such functions secured to the ends of said stock by means of a recess in each gauge member shaped to closely fit the end of said stock, each of said members having a recess in its outer end, a bolt having a head secured against inward movement in one of said recesses and extending through said gauge members and through said stock, and a nut secured to the threaded end of the bolt in the other of said recesses to draw the gauge members into tight engagement with the bottoms of said recesses.

3. A gauge device including a stock of hexagonal shape in cross section, a gauge member secured to each end of the stock by means of a recess in each gauge member shaped to closely fit the end of the stock, each of said members having a recess in its outer end, a disk having a recess in one face and located in the recess in the outer end of one of said members, a bolt extending through said disk and having a head located in the recess therein, and a nut secured to the threaded end of the bolt within the recess in the other of said gauge members.

4. A gauge device including a stock of hexagonal shape in cross section, gauge members secured to each end of said stock by means of a recess in each gauge member shaped to closely fit an end of the stock, each of said members having a recess in its outer end, a disk located in the recess in the outer end of one of said members and having a beveled recess, a bolt having a head with a beveled under-surface to fit within the recess in said disk and extending through said gauge members and stock into the recess in the outer end of the other gauge member, and a nut secured to the threaded end of said bolt within the recess in the outer end of the gauge member last mentioned.

5. A gauge device including a stock of hexagonal shape in cross section, gauge members having associated functions for cooperative relation requiring to be relationally positioned for such functions secured to the ends of said stock by means of a recess in each gauge member shaped to closely fit the end of the stock, each of said members having a recess in its outer end, a hole extending between said recesses in each of said gauge members, a bolt having a head secured against movement in the recess in the outer end of one of said gauge members and extending through said gauge members and through the stock, and a nut secured to the threaded end of the bolt in the other of said recesses to draw the gauge members into tight engagement with the bottoms of said recesses.

6. A gauge device including a stock of hexagonal shape in cross section, a gauge member secured to each end of said stock by means of a recess in each gauge member shaped to closely fit the end of the stock, each of said members having a recess in its outer end and a hole extending between the recesses therein and tapered from a smaller diameter to a larger diameter from its outer to its inner end, and a nut secured to the end of said bolt within the recess at the outer end of one of said gauge members.

7. A gauge device including a stock of non-circular shape in cross section, a gauge member having associated functions for cooperative relations requiring to be relationally positioned for such functions secured to one end of said stock by means of a recess in said gauge member shaped to closely fit the end of said stock, said gauge member having a recess in its outer end, a bolt having a head secured against inward movement in said recess and extending through said gauge member and through said stock, and a nut secured to the threaded end of said bolt to draw the gauge member into tight engagement with said stock.

8. A gauge device including a stock of hexagonal shape in cross section, a gauge member having associated functions for cooperative relations requiring to be relationally positioned for such functions secured to one end of the stock by means of a recess in said gauge member shaped to closely fit the end of said stock, said gauge member having a recess in its outer end, a bolt having a head secured against inward movement and extending through said gauge member and through said stock, and a nut secured to the threaded end of the bolt to draw the gauge member into tight engagement with the bottom of said recess.

EDGAR C. LUNDEBERG.